United States Patent [19]

Reed et al.

[11] Patent Number: 4,560,829

[45] Date of Patent: Dec. 24, 1985

[54] FOAMED FLUOROPOLYMER ARTICLES HAVING LOW LOSS AT MICROWAVE FREQUENCIES AND A PROCESS FOR THEIR MANUFACTURE

[76] Inventors: Donald A. Reed, 465 Seventh Ave.; Hans E. Lunk, 1145 Monte Rosa Dr., both of Menlo Park, Calif. 94025

[21] Appl. No.: 513,482

[22] Filed: Jul. 12, 1983

[51] Int. Cl.⁴ .................... B29D 27/00; H01B 11/18; H01B 13/24; H01P 3/06
[52] U.S. Cl. .................................. 174/102 R; 29/828; 264/45.9; 264/5.3; 264/DIG. 5; 174/110 F; 333/243; 521/145
[58] Field of Search ................. 264/45.9, 53, DIG. 5; 29/828; 174/102 R; 521/145; 174/110 R; 333/243

[56] References Cited

U.S. PATENT DOCUMENTS

| | | | |
|---|---|---|---|
| 3,972,970 | 8/1976 | Taylor | 264/45.9 |
| 4,099,897 | 7/1978 | Takano et al. | 264/45.9 X |
| 4,107,354 | 8/1978 | Wilkenloh et al. | 264/45.9 X |
| 4,304,713 | 12/1981 | Perelman | 264/45.9 |
| 4,352,701 | 10/1982 | Shimba et al. | 264/45.9 X |

Primary Examiner—Philip Anderson

[57] ABSTRACT

Foamed polymers having low loss at microwave frequencies are prepared through use of perfluorinated alkane foaming agents. The invention is particularly valuable for polymers which are melt-processed at high temperatures, especially fluoropolymers such as tetrafluoroethylene copolymers. The polymeric foams are particularly useful as electrical insulation, especially for coaxial cables suitable for use at microwave frequencies.

20 Claims, 3 Drawing Figures

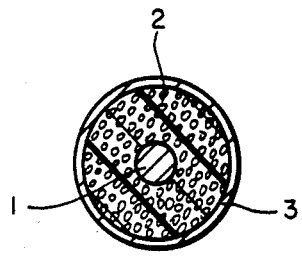
FIG_1
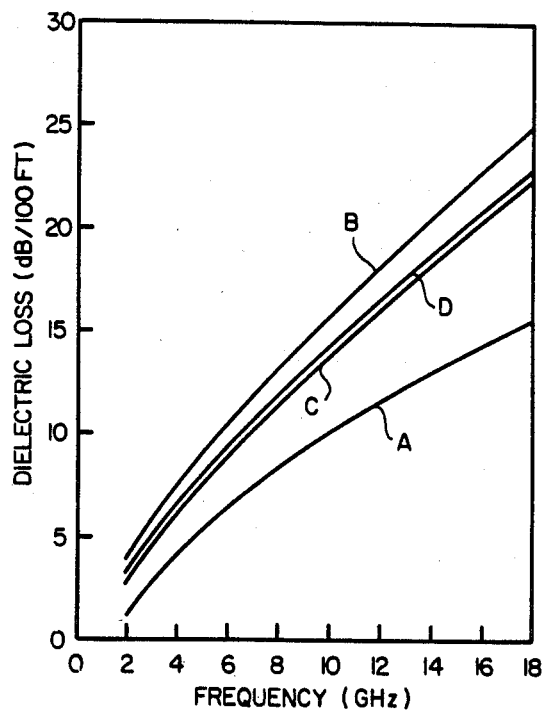
FIG_2
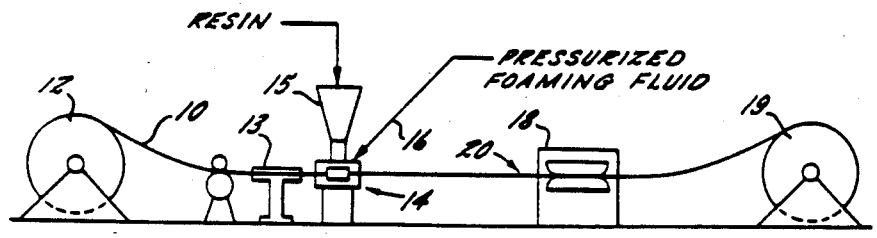
FIG_3

FOAMED FLUOROPOLYMER ARTICLES HAVING LOW LOSS AT MICROWAVE FREQUENCIES AND A PROCESS FOR THEIR MANUFACTURE

BACKGROUND OF THE INVENTION

1. Field of the Invention

This invention relates to foamed polymers having low loss at microwave frequencies.

2. Introduction to the Invention

It is known to use foamed polymers, e.g. polyethylene, to provide lightweight electrical insulation, e.g. in coaxial cables. For a number of uses, it is also important that the polymer be foamed in order to reduce losses at microwave frequencies. The magnitude of these losses is dependent upon the loss tangent and permittivity of the insulation. By incorporation of voids (which are loss-free ) in the dielectric material, as in foamed polymers, both the loss tangent and permittivity are lowered, yielding a substantial reduction in microwave losses. This result has been achieved in the past by the foaming of low loss polymers, e.g. polyethylene, with conventional blowing agents, e.g. through the decomposition of a chemical such as azobisformamide. Unfortunately, however, these conventional foams lack adequate thermal and/or chemical stability for a number of important uses. For example, a number of end uses require stability at 150° C., and polyethylene foam collapses at such temperatures. Similarly, stability of the foam when exposed to oxygen is often required, and the presence of the antioxidants needed to meet this requirement results in a foam having undesirably high loss.

SUMMARY OF THE INVENTION

In attempting to make use of fluoropolymers of high melting point in order to provide foams having the desired thermal stability, we have found that known blowing agents are not satisfactory for this purpose. Known hydrocarbon blowing agents such as n-heptane give rise to foams having undesirably high losses, apparently because they decompose and/or react, under the extrusion and foaming conditions, so that the foamed product contains materials having a high loss tangent. Known halogented blowing agents, such as monochloro-difluoromethane ($CHClF_2$), give rise to corrosion (of the equipment used to extrude the polymeric composition and/or the metal conductors contacted by the polymeric foam in the final product) and/or suffer from other disadvantages. We have found that perfluorinated alkanes are excellent blowing agents for polymers which are to be converted into low loss foams, in particular for fluoropolymers and other high melting polymers.

Accordingly, in its first aspect, the present invention provides a method of making a shaped article of a foamed polymer having low loss at microwave frequencies, which method comprises (1) mixing a polymer having a loss tangent of less than 0.0015 at 10 GHz, and preferably at all frequencies in the range 3 to 18 Ghz, with a foaming agent having the formula $C_nF_{2n+2}$, wherein n is at least 1; and (2) shaping the polymeric mixture obtained in step (1) under conditions which cause the foaming agent to expand and convert the polymer into a foam.

This method is especially useful in a method of making a coaxial cable which is suitable for use at microwave frequencies and which comprises a central conductor, a foamed polymer dielectric layer surrounding the central conductor, and an outer conductive layer which is separated from the central conductor by the dielectric layer, which method comprises (1) melt-extruding around the central conductor a mixture of (a) a melt-extrudable fluoropolymer having a loss tangent of less than 0.0015 at 10 GHz, and preferably at all frequencies in the range of 3 to 18 GHz, and (b) a foaming agent having the formula $C_nF_{2n+2}$, wherein n is at least 1, thereby forming a foamed polymer dielectric layer around the central conductor; and (2) placing an outer cnductive layer around the foamed dielectric layer.

At least as initially produced, the foamed dielectrics produced by the above methods contain residues of the novel foaming agent, and can be recognized by this fact. Thus the invention further comprises a shaped article, especially a coaxial cable, which has low loss at microwave frequencies and which comprises an elongate conductor and an elongate dielectric contacting the conductor and composed of a foamed polymer which contains residues of a foaming agent used to foam the polymer, the foaming agent having the formula $C_nF_{2n+2}$, wherein n is at least 1, and the foamed dielectric having a loss contribution of less than 18 dB/foot at a frequency of 10 GHz, and preferably at all frequencies in the range 3 to 18 GHz. The term "residues" is used in this specification to mean the foaming agent itself and/or, if the foaming agent decomposes or reacts, decomposition products of the foaming agent or reaction products of the polymer and the foaming agent (or decomposition products thereof).

We believe that, at least after an extended period, it will be difficult or impossible to detect residues of perfluorinated alkane blowing agents, since the blowing agents themselves are relatively volatile and they do not (in contrast to known blowing agents) react or decompose during the shaping and foaming process. Accordingly, in a further aspect, the invention provides an elongate article which has low loss at microwave frequencies and which comprises an elongate conductor and an elongate dielectric contacting the conductor and composed of a foamed polymer which is substantially free of residues of foaming agent used to foam the polymer, the polymer having a melting point of at least 200° C., and the loss contribution of the foamed dielectric being less than 0.17 dB/foot at a frequency of 10 Ghz.

BRIEF DESCRIPTION OF THE DRAWING

The invention is illustrated in the accompanying drawing, in which

FIG. 1 is a cross-section through a coaxial cable prepared according to the method defined above, FIG. 2 shows the loss characteristics of the foamed dielectrics prepared in the Examples and FIG. 3 is a diagrammatic illustration of a process in which a foamed polymeric jacket is placed around a conductor, e.g. in the manufacture of a coaxial cable.

DETAILED DESCRIPTION OF THE INVENTION

To achieve low microwave losses in a polymer dielectric, the loss tangent and permittivity of the unfoamed dielectric material should be as small as possible. The polymers used in this invention, before foaming, have loss tangents of less than 0.0015, preferably less than 0.0010, and preferably have dielectric permittivities of less than 2.5, especially less than 2.1, at a frequency of 10 GHz, and preferably at all frequencies in the range of 3 to 18 GHz. The microwave losses are also affected by the dimensions of the foamed dielectric and the extent of foaming. These and any other factors which affect microwave losses can be effectively summarized by saying that in this invention, the loss contribution of the foamed dielectric is generally less than 18 dB/foot, preferably less than 17 dB/foot, more preferably less than 15 dB/foot, particularly less than 14 dB/foot, especially less than 11 dB/foot at a frequency of 10 GHz, and is preferably less than 18, particularly less than 17, especially less than 16, at all frequencies in the range 3 to 18 GHz.

The invention is particularly useful when the polymers are processed at temperatures which result in decomposition and/or reaction of conventional foaming agents, particularly at least 200° C., especially at least 250° C., e.g. at least 280° C. Any suitable method of processing the polymer can be used, but melt-shaping, and particularly melt-extrusion, are preferred. The polymers used are preferably fluoropolymers having melting points of at least 250° C., particularly fluoropolymers which are substantially free of hydrogen, especially melt-processable copolymers of tetrafluoroethylene with suitable comonomers such as hexafluoropropylene and perfluoroalkoxyalkenes. Suitable commercial available copolymers include those sold by E. I. duPont de Nemours under the trade names Teflon FEP and Teflon PFA.

The foaming agents used in this invention are perfluoroalkanes of the formula $C_nF_{2n+2}$, where n is at least 1, generally at least 2, preferably 4 to 6. Straight chain compounds are preferred, in particular perfluorobutane, perfluropentane and perfluorohexane. Preferaby the foaming agent in liquid form is injected into the molten polymer before it is shaped. However, other known methods of mixing a polymer and foaming agent can also be used; for example the foaming agent can be injected as a gas into the molten polymer before it is shaped.

Referring now to FIG. 1, this shows a coaxial cable having a center metal conductor 1, a foamed dielectric 2, and an outer metal conductor 3.

FIG. 2 shows the loss characteristic of the foamed dielectrics prepared in the Examples.

FIG. 3 shows a process for manufacturing a jacketed electrical conductor (which may be the core of a coaxial cable) according to the present invention. As there shown, an electrical conductor 10 is withdrawn from a supply reel 12 and then chemically cleaned and passed through a heater 13. From the heater 13, the electrical conductor 10 is passed through the crosshead of an extruder 14. A foamable melt-extrudable fluoropolymer is fed into the extruder 14 from a hopper 15 and is shaped as a layer around the conductor. To foam the melt extrudable resin, a pressurized volatile liquid is fed into the extruder 14 through a line 16 and is mixed with the molten fluoropolymer so that the dielectric layer formed around the conductor 10 foams after it exits from the extruder.

Within the extruder, the fluoropolymer resin is heated above its melt temperature prior to injection of the volatile liquid to obtain thorough dissolution mixing of the liquid throughout the resin. Between the point where the volatile liquid is injected into the fluoropolymer and the exit die, the temperature is reduced to the desired melt temperature. The resulting jacketed conductor 10 is drawn through the process line by a capstan 18 and wound onto a take-up reel 19.

The invention is illustrated by the following Examples, in which parts and percentages are by weight except where otherwise noted. Examples 2 to 4 are comparative Examples and are not in accordance with the invention.

EXAMPLE 1

The dielectric layer of a coaxial cable was formed by conventional single screw melt extrusion of a mixture of a tetrafluoroethylene/hexafluoropropylene copolymer (FEP 100 available from du Pont) and 1% of a fine powder boron nitride nucleating agent. Perfluoropentane was injected under pressure through a port in the extruder barrel at a rate to produce a concentration of approximately 1% perfluoropentane in the melt. The polymer melt was extruded through a conventional crosshead die onto a 16 AWG stranded silver-plated copper wire. The resulting shaped dielectric had an outer diameter of 0.143 inch and a void level of 65%. The copper wire with the surrounding foamed dielectric was placed coaxially into the interior of a high conductivity aluminum tube with an outer diameter of 0.312 inch and an inner diameter of 0.284 inch and then drawn through a 0.173 inch cold drawing die. The aluminum tube was thereby snugly formed around the shaped dielectric, leaving no void space between the dielectric and the aluminum, and causing no distortion of the shaped dielectric.

The coaxial cable was terminated with properly matched SMA connectors and transmission losses were measured in the frequency range from 3 to 18 GHz. The dielectric loss in dB/100 ft was calculated from the following equation:

$$a_D = a_T - 10.423 \frac{\sqrt{f}}{Z_o} \left[ \frac{K_s \sqrt{R_{oc}}}{d_{oc}} + \frac{\sqrt{R_{oc}}}{D_d} \right]$$

where
$a_D$=dielectric loss (dB/100 ft.)
$a_T$=total transmission loss (dB/100 ft.) $aF$=frequency (GHz)
$Z_o$=characteristic impedance (ohm)
$R_{cc}$=resistivity of center conductor (microohm/cm)
$R_{oc}$=resistivity of outer conductor (microohm/cm)
$d_{cc}$=diameter of center conductor (inches)
$D_d$=diameter of shaped dielectric (inches)
$K_s$=center conductor stranding loss factor, taken as 1.3 from literature data The second term on the right hand side of this equation represents the loss contribution of the conductors to the total transmission loss.

The calculated dielectric losses are plotted in FIG. 2, curve A.

EXAMPLE 2

The procedure described in Example 1 was repeated except that n-heptane as used as the blowing agent. The dielectric losses are shown in FIG. 2, Curve B.

EXAMPLE 3

The procedure described in Example 1 was repeated except that benzene was used as the blowing agent. The dielectric losses are shown in FIG. 2, Curve C.

EXAMPLE 4

The procedure described in Example 1 was repeated except that $CH_2Cl_2$ was used as the blowing agent. The dielectric losses are shown in FIG. 2, Curve D.

We claim:

1. An elongate article which has low loss at microwave frequencies and which comprises an elongate conductor and an elongate dielectric contacting the conductor and composed of a foamed fluoropolymer which has a melting point of at least 150° C. and a loss tangent of less than 0.0015, which has been melt-extruded around the conductor, and which contains residues of a foaming agent used to foam the polymer, the foaming agent having the formula $C_nF_{2n+2}$, wherein n is at least 3, and the foamed dielectric having a loss contribution of less than 0.14 dB/foot at a frequency of 10 GHz.

2. An article according to claim 1 wherein the foamed dielectric has a dielectric constant of less than 1.45.

3. An article according to claim 1 wherein the foaming agent is a compound of the formula $C_nF_{2n+2}$ where n is at least 4.

4. An article according to claim 3 which is a coaxial cable.

5. An elongate article which has low loss at microwave frequencies and which comprises an elongate conductor and an elongate dielectric contacting the conductor and composed of a foamed fluoropolymer which has a melting point of at least 150° C. and a loss tangent of less than 0.0015, which has been melt-extruded around the conductor, and which is substantially free of residues of foaming agent used to foam the polymer, the loss contribution of the foamed dielectric being less than 0.14 dB/foot at a frequency of 10 GHz.

6. An article according to claim 5 wherein the polymer is a fluoropolymer which is substantially free of hydrogen.

7. An article according to claim 5 wherein the loss contribution of the foamed dielectric is less than 0.14 dB/foot at a frequency of 10 GHz.

8. An article according to claim 7 wherein the loss contribution of the foamed dielectric is less than 0.11 dB/foot at a frequency of 10 GHz.

9. An article according to claim 5 which is a coaxial cable.

10. A method of making a shaped article which is composed of an electrically insulating foamed polymer having low loss at microwave frequencies, which method comprises (1) mixing together (a) a melt-extrudable fluoropolymer having a melting point of at least 250° C. and a loss tangent of less than 0.0015 at 10 GHz and (b) a foaming agent having the formula $C_nF_{2n+2}$, wherein n is at least 3; and (2) melt-extruding the mixture obtained in step (1) under conditions which cause the foaming agent to expand and convert the polymer into a foam having a loss of less than 0.14 dB/foot at 10 GHz.

11. A method according to claim 10 wherein the foam has a loss of less than 0.11 dB/foot.

12. A method according to claim 10 wherein the polymer is a copolymer of tetrafluoroethylene and hexafluoropropylene.

13. A method according to claim 10 wherein the polymer is a copolymer of tetrafluoroethylene and a perfluoroalkoxyalkene.

14. A method according to claim 10 wherein the foaming agent is selected from the group consisting of perfluorobutane, perfluoropentane and perfluorohexane.

15. A method according to claim 10 wherein the foamed dielectric has a loss of less than 0.15 dB/foot at a frequency of 10 GHz.

16. A method according to claim 10 wherein the foamed dielectric has a dielectric constant of less than 1.45.

17. A method of making a coaxial cable which is suitable for use at microwave frequencies and which comprises a central conductor, a foamed polymer dielectric layer surrounding the central conductor, and an outer conductive layer which is separated from the central conductor by the dielectric layer, which method comprises (1) melt-extruding around the central conductor a mixture p1 (1) a melt-extrudable fluoropolymer having a melting point of at least 250° C. and a loss tangent of less than 0.0015 at 10 GHz and (b) a foaming agent having the formula $C_nF_{2n+2}$, wherein n is at least 3, thereby forming a foamed polymer dielectric layer around the central conductor, said layer having a loss of less than 0.14 dB/foot at a frequency of 10 GHz; and (2) placing an outer conductive layer around the foamed dielectric layer.

18. A method according to claim 17 wherein the polymer is a copolymer of tetrafluoroethylene and hexafluropropylene.

19. A method according to claim 17 wherein the polymer is a copolymer of tetrafluoroethylene and perfluoroalkoxyalkene.

20. A method according to claim 17 wherein the foaming agent is a compound fo the formula $C_nF_{2n+2}$ wherein n is an integer from 4 to 6 inclusive.

* * * * *